United States Patent
Fu et al.

(10) Patent No.: US 10,788,928 B2
(45) Date of Patent: Sep. 29, 2020

(54) DETECTION OF VIBRATION FREQUENCY VALUE ARISEN FROM TOUCH MODULE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Jianbo Fu, Beijing (CN); Hailong Wu, Beijing (CN); Yi Dan, Beijing (CN); Yan Zhou, Beijing (CN); Dalong Mao, Beijing (CN); Haipeng Zhu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/393,038

(22) Filed: Apr. 24, 2019

(65) Prior Publication Data
US 2020/0167032 A1    May 28, 2020

(30) Foreign Application Priority Data

Nov. 23, 2018  (CN) .......................... 2018 1 1407659

(51) Int. Cl.
*G06F 3/041* (2006.01)
*G01J 9/02* (2006.01)
*F21V 8/00* (2006.01)
*G06F 3/01* (2006.01)

(52) U.S. Cl.
CPC .............. *G06F 3/0416* (2013.01); *G01J 9/02* (2013.01); *G02B 6/0055* (2013.01); *G06F 3/016* (2013.01)

(58) Field of Classification Search
CPC ......... G06F 3/0416; G01J 9/02; G02B 6/0055
See application file for complete search history.

(56) References Cited

U.S. PATENT DOCUMENTS

| 2010/0079413 | A1* | 4/2010 | Kawashima | B60K 35/00 345/175 |
| 2016/0132115 | A1* | 5/2016 | Haga | G06F 3/0412 345/173 |
| 2016/0154462 | A1* | 6/2016 | Haga | G06F 3/047 345/174 |
| 2016/0310844 | A1* | 10/2016 | Yamashita | A63F 13/28 |
| 2017/0300028 | A1* | 10/2017 | Yamashita | A63F 13/285 |
| 2019/0212865 | A1* | 7/2019 | Shiroto | G06F 3/0416 |

* cited by examiner

*Primary Examiner* — Chun-Nan Lin
(74) *Attorney, Agent, or Firm* — Brooks Kushman P.C.

(57) ABSTRACT

Embodiments of the present disclosure provide a touch module, a method for operating the same, and a display device. The touch module includes: a touch substrate; a frequency determining circuit configured to detect a frequency value of a vibration generated by the touch substrate; and an instruction transmitting circuit, having a signal input terminal electrically connected to a signal output terminal of the frequency determining circuit, and configured to determine a target instruction corresponding to the frequency value and output the target instruction.

8 Claims, 8 Drawing Sheets

DETECTION OF VIBRATION FREQUENCY VALUE ARISEN FROM TOUCH MODULE

CROSS-REFERENCE TO RELATED APPLICATION

This application claims priority to Chinese Patent Application No. 201811407659.3 filed on Nov. 23, 2018, which is incorporated herein by reference in its entirety.

TECHNICAL FIELD

The present disclosure relates to the field of touch technologies, in particular to a touch module, an operating method therefor, and a display device.

BACKGROUND

A display device includes an inductive display device capable of receiving a signal input by a contact or the like. When an action is generated after the contact of the display device, a haptic feedback system on the display device can complete a corresponding human-computer interaction according to a pre-programmed program, and the display device can exhibit an intuitive, natural and vivid picture effect during the operation of a user, and is quite popular among consumers.

In related art, a variety of sensors are usually provided around the screen of the display device to serve the user. For example, in order to prevent the user's erroneous operations caused by accidentally touching the screen during a call, distance sensors for sensing a distance between the face and the screen are provided around the screen. However, these sensors disposed around the screen are not conducive to the development of the display device towards a full screen.

SUMMARY

In a first aspect, embodiments of the present disclosure provide a touch module that includes: a touch substrate; a frequency determining circuit configured to detect a frequency value of a vibration generated by the touch substrate; and an instruction transmitting circuit having a signal input terminal electrically connected to a signal output terminal of the frequency determining circuit, and configured to determine a target instruction corresponding to the frequency value and output the target instruction.

According to some embodiments of the present disclosure, the frequency determining circuit includes: a synchronization feedback device configured to sense the vibration of the touch substrate and output an electrical signal that changes in synchronism with the vibration of the touch substrate; and a demodulation sub-circuit having a signal input terminal electrically connected to a signal output terminal of the synchronization feedback device, and configured to demodulate the electrical signal outputted by the synchronization feedback device to obtain the frequency value of the vibration generated by the touch substrate.

According to some embodiments of the present disclosure, the synchronization feedback device is made of a piezoelectric ceramic, which is in direct contact with the touch substrate and which is synchronously pressed and deformed during the vibration of the touch substrate to output an electrical signal that changes in synchronism with the vibration of the touch substrate.

According to some embodiments of the present disclosure, the synchronization feedback device is an air pressure sensor, and the touch module further includes a structural component that encloses a sealed space together with the touch substrate, in which an air pressure changes synchronously during the vibration of the touch substrate, and the air pressure sensor detects a change in the air pressure in the sealed space to output an electrical signal that changes in synchronism with the vibration of the touch substrate.

According to some embodiments of the present disclosure, the frequency value of the vibration generated by the touch substrate includes: a first frequency value that is a frequency value of a vibration generated by the touch substrate when a finger touches the touch substrate; a second frequency value that is a frequency value of a vibration generated by the touch substrate when an ear makes contact with the touch substrate while getting close to an earpiece; and a third frequency value that is a frequency value of a vibration generated by the touch substrate when a nail makes contact with the touch substrate, wherein the first frequency value, the second frequency value, and the third frequency value are different from one another.

According to some embodiments of the present disclosure, the frequency value of the vibration generated by the touch substrate is set in association with a human body part, wherein the associated setting is carried out by collecting the frequency value of the vibration generated by the touch substrate when a user makes contact with the touch substrate through the human body part for the first time.

According to some embodiments of the present disclosure, the target instruction includes a normal display instruction, a screen blackout instruction, and a picture insertion operation instruction.

In a second aspect, embodiments of the present disclosure provide a display device that includes a touch module. The touch module includes: a touch substrate; a frequency determining circuit configured to detect a frequency value of a vibration generated by the touch substrate; and an instruction transmitting circuit having a signal input terminal electrically connected to a signal output terminal of the frequency determining circuit, and configured to determine a target instruction corresponding to the frequency value and output the target instruction.

According to some embodiments of the present disclosure, the display device further includes a coverplate, a display substrate, and a circuit board, wherein the instruction transmitting circuit of the touch module is integrated in the circuit board, and the touch substrate of the touch module is used as the coverplate of the display device.

According to some embodiments of the present disclosure, the frequency determining circuit includes: a synchronization feedback device configured to sense the vibration of the touch substrate and output an electrical signal that changes in synchronism with the vibration of the touch substrate; and a demodulation sub-circuit integrated in the circuit board, having a signal input terminal electrically connected to a signal output terminal of the synchronization feedback device, and configured to demodulate the electrical signal outputted by the synchronization feedback device to obtain the frequency value of the vibration generated by the touch substrate.

According to some embodiments of the present disclosure, the synchronization feedback device includes a piezoelectric crystal having a signal output terminal that is electrically connected to the signal input terminal of the demodulation sub-circuit; the piezoelectric crystal is disposed between the coverplate and the display substrate; or the piezoelectric crystal is disposed on a side of the display substrate facing away from the coverplate; or the piezoelectric crystal is integrally provided with the coverplate.

According to some embodiments of the present disclosure, the synchronization feedback device includes a strain component having a signal output terminal that is electrically connected to the signal input terminal of the demodulation sub-circuit; the strain component is disposed between the touch substrate and the display substrate; or the strain component is disposed within the display substrate.

According to some embodiments of the present disclosure, the display device is a liquid crystal display device, and the display substrate includes a light guide plate and a reflective sheet, between which interference light is formed; and the synchronization feedback device includes: a light receiving circuit disposed between the light guide plate and the reflective sheet and configured to detect an interference spectrum between the light guide plate and the reflective sheet; and a photoelectric conversion circuit having a signal output terminal electrically connected to the signal input terminal of the demodulation sub-circuit, and configured to output an electrical signal corresponding to the interference spectrum detected by the light receiving circuit.

According to some embodiments of the present disclosure, the synchronization feedback device is made of a piezoelectric ceramic, which is in direct contact with the touch substrate and which is synchronously pressed and deformed during the vibration of the touch substrate to output an electrical signal that changes in synchronism with the vibration of the touch substrate.

According to some embodiments of the present disclosure, the synchronization feedback device is an air pressure sensor, and the touch module further includes a structural component that encloses a sealed space together with the touch substrate, in which an air pressure changes synchronously during the vibration of the touch substrate, and the air pressure sensor detects a change in the air pressure in the sealed space to output an electrical signal that changes in synchronism with the vibration of the touch substrate.

According to some embodiments of the present disclosure, the frequency value of the vibration generated by the touch substrate includes: a first frequency value that is a frequency value of a vibration generated by the touch substrate when a finger touches the touch substrate; a second frequency value that is a frequency value of a vibration generated by the touch substrate when an ear makes contact with the touch substrate while getting close to an earpiece; and a third frequency value that is a frequency value of a vibration generated by the touch substrate when a nail makes contact with the touch substrate, wherein the first frequency value, the second frequency value, and the third frequency value are different from one another.

According to some embodiments of the present disclosure, the frequency value of the vibration generated by the touch substrate is set in association with a human body part, wherein the associated setting is carried out by collecting the frequency value of the vibration generated by the touch substrate when a user makes contact with the touch substrate through the human body part for the first time.

According to some embodiments of the present disclosure, the target instruction includes a normal display instruction, a screen blackout instruction, and a picture insertion operation instruction.

In a third aspect, embodiments of the present disclosure provide a method for operating a touch module, applied to the touch module in the first aspect. The method includes obtaining a frequency value of a vibration generated by the touch substrate, detected by the frequency determining circuit; and determining, by the instruction transmitting circuit, a target instruction corresponding to the frequency value and output the target instruction.

According to some embodiments of the present disclosure, the method is applied to the touch module in the first aspect. The obtaining the frequency value of the vibration generated by the touch substrate, detected by the frequency determining circuit includes obtaining an electrical signal, which changes in synchronism with the vibration of the touch substrate and is outputted by sensing the vibration of the touch substrate by the synchronization feedback device; and demodulating, by the demodulation sub-circuit, the electrical signal output by the synchronization feedback device to obtain the frequency value of the vibration generated by the touch substrate.

BRIEF DESCRIPTION OF THE DRAWINGS

In order to illustrate technical solutions of embodiments of the present disclosure more clearly, the accompanying drawings needed in the description of the embodiments of the present disclosure will be briefly described below. It is obvious that the drawings in the following description only relate to some of the embodiments of the present disclosure. Based on these drawings, other drawings may be obtained by those skilled in the art without exercising any inventive work.

DETAILED DESCRIPTION

Figure 1:
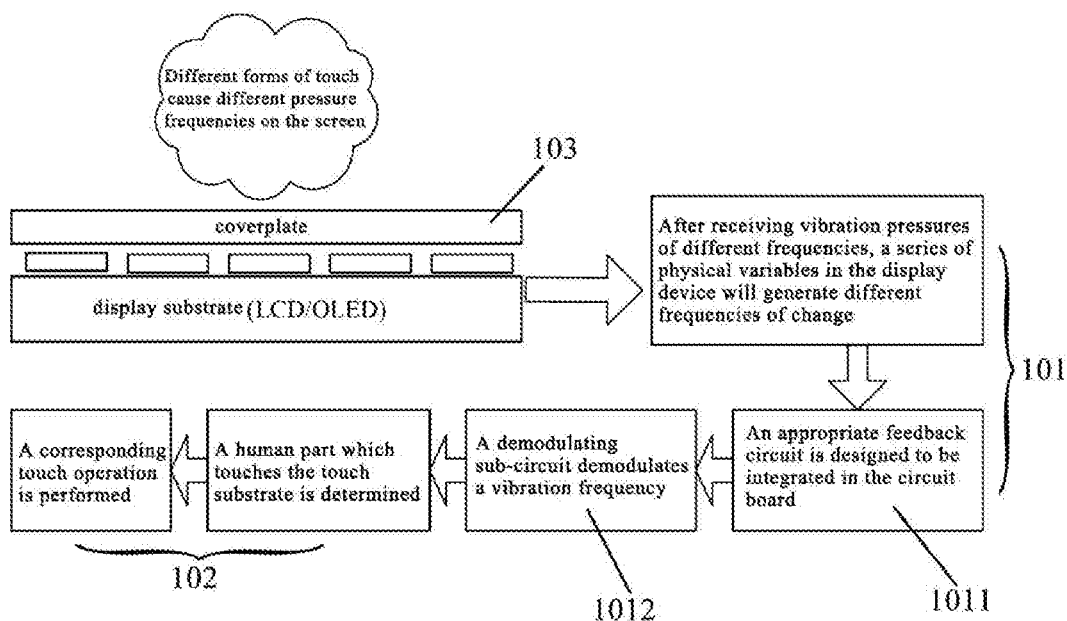
FIG. 1 is a schematic diagram showing an operation principle of a display device provided by an embodiment of the present disclosure.

The technical solutions of the embodiments of the present disclosure will be clearly and completely described in conjunction with the drawings in the embodiments of the present disclosure. It is obvious that the described embodiments are a human part of, rather than all of, the embodiments of the present disclosure. Based on the described embodiments of the present disclosure, a person having ordinary skill in the art obtains all other embodiments without exercising any inventive work, which falls within the protection scope of the disclosure.

In the display device of the related art, a variety of sensors are disposed around the screen in order to facilitate a user's diversified operation of the display device, and the display device determines a corresponding instruction for operation by sensing the user's operation by means of the sensors. However, these sensors disposed around the screen are not conducive to the development of the display device towards a full screen.

To solve the above problem, embodiments of the present disclosure provide a touch module, a method for operating the same, and a display device, which enable the omission of the sensors disposed around the screen of the display device without adversely affecting functions, and thus facilitate the increase of the screen-to-body ratio of the screen.

Embodiments of the present disclosure provide a touch module including: a touch substrate; a frequency determining circuit which is configured to detect a frequency value of a vibration generated by the touch substrate; and an instruction transmitting circuit which has a signal input terminal electrically connected to a signal output terminal of the frequency determining circuit, and which is configured to determine a target instruction corresponding to the frequency value and output the target instruction.

In this embodiment, the target instruction is determined by detecting the frequency value of the vibration generated by the touch substrate when it is operated by the user, instead of by determining the target instruction by means of the sensors disposed around the screen. In this way, the sensors disposed around the screen of the display device can be omitted without adversely affecting functions, and the screen-to-body ratio of the screen can be increased. Therefore, the technical solution provided by the embodiment of the present disclosure can not only save the production cost of the display device, but also contribute to the development of the display device towards the full screen.

The touch substrate is disposed on an outer surface of the touch module, and a user may contact the touch substrate through different parts. Since proportions of muscles and bones in different human body parts are different and a series of ingredients such as moisture and/or calcium inside the bones are also different, when the different human body parts make contact with the touch substrate, it is equivalent to different objects contacting the screen, resulting in different frequency values of vibrations. That is, when the different human body parts are in contact with the screen, the frequency values of vibrations generated by the touch substrate are different. For example, a frequency value of a vibration generated by the touch substrate when a finger touches the touch substrate is a first frequency value, a frequency value of a vibration generated by the touch substrate when an ear makes contact with the touch substrate while getting close to an earpiece is a second frequency value, and a frequency value of a vibration generated by the touch substrate when a nail makes contact with the touch substrate is a third frequency value. Here, the first frequency value, the second frequency value, and the third frequency value are different from one another. The above gives merely several examples of human body parts that may come into contact with the touch substrate, and the human body parts are not limited thereto, and the contact may take place between the human body part such as a face, a knuckle or the like and the touch substrate.

By associating a frequency value of a vibration generated by the touch substrate with a corresponding human body part, a human part through which the user makes contact with the touch substrate can be then directly determined based on a frequency value of a vibration generated by the touch substrate detected by the frequency determining circuit. Specifically, the associated arrangement between a frequency value and a human body part may be carried out by associating the frequency value of the vibration generated by the touch substrate when a user makes contact with the touch substrate through the human body part for the first time with the human body part. Of course, it can be understood by those skilled in the art that the associated setting between a frequency value and a human body part may also be carried out by collecting a frequency value of a vibration generated by the touch substrate due to a predetermined one or more contacts or multiple consecutive contacts that the user makes with the touch substrate through the human body part, and associating the frequency value with the human body part. This will not be described in detail herein.

In addition, a target instruction corresponding to a contact between each part and the touch substrate is set in advance, which is equivalent to a target instruction corresponding to a frequency value generated by the touch substrate, and a mapping relationship between them is stored in the instruction transmitting circuit, whereby the instruction transmitting circuit is capable of determining the target instruction based on the frequency value of the vibration generated by the touch substrate detected by the frequency determining circuit. For example, if a case where an ear makes contact with the touch substrate corresponds to a screen blackout instruction, the screen is blacked out to prevent any accidental touch when the user receives a voice message and the ear makes contact with the touch substrate and the touch module detects that a frequency value of a vibration generated by the touch substrate is the second frequency value. For another example, if a case where a nail makes contact with the touch substrate in a mail input interface corresponds to a picture insertion instruction, a picture insertion operation is performed when the user touches the touch substrate with the nail in the mail input interface displayed by the display device and the touch module detects that a frequency value of a vibration generated by the touch substrate is the third frequency value.

In some optional embodiments, the frequency determining circuit may include a synchronization feedback device which is configured to sense the vibration of the touch substrate and output an electrical signal that changes in synchronism with the vibration of the touch substrate, and a demodulation sub-circuit which has a signal input terminal electrically connected to a signal output terminal of the synchronization feedback device and which is configured to demodulate the electrical signal outputted by the synchronization feedback device to obtain the frequency value of the vibration generated by the touch substrate.

The synchronization feedback device can make direct or indirect contact with the touch substrate, and changes itself synchronously, such as vibration or deformation, due to a vibration of the touch substrate, and thus outputs an electrical signal that changes in synchronism with the vibration of the touch substrate according to its own electrical characteristics. For example, the synchronization feedback device may be made of a piezoelectric ceramic, which is in direct contact with the touch substrate. During the vibration of the touch substrate, the piezoelectric ceramic is synchronously pressed and deformed to output an electrical signal (e.g., a voltage signal) that changes in synchronism with the vibration of the touch substrate.

Alternatively, the synchronization feedback device may not be in contact with the touch substrate, but sense the vibration of the touch substrate through an optical medium or air medium between the synchronization feedback device and the touch substrate to output an electrical signal that changes in synchronism with the vibration of the touch substrate. For example, the synchronization feedback device may be an air pressure sensor, and the touch module includes a structural component that encloses a sealed space together with the touch substrate, in which an air pressure changes synchronously during the vibration of the touch substrate, and the air pressure sensor detects a change in the air pressure in the sealed space to output an electrical signal that changes in synchronism with the vibration of the touch substrate.

The above merely illustrates two modes i.e., via direct contact and via interval sensing, in which the synchronization feedback device realizes the sensing of the vibration of the touch substrate to output an electrical signal that changes in synchronism with the vibration of the touch substrate. In other embodiments, it may be implemented by components such as strain gauges, and the above mode is not limited.

The synchronization feedback device outputs the electrical signal that changes synchronously with the vibration of the touch substrate, that is, the synchronization feedback device outputs a waveform curve carrying frequency values of vibrations generated by the touch substrate, which waveform curve needs to be demodulated by a demodulation circuit so as to achieve the analysis of the frequency value of the vibration generated by the touch substrate.

In this embodiment, since the synchronization feedback device can output an electrical signal that changes synchronously with the vibration of the touch substrate, the demodulation of the electrical signal by the demodulation circuit will result in a more accurate frequency value of the vibration generated by the touch substrate, making it possible to improve the touch module's detection accuracy of the frequency value of the vibration generated by the touch substrate.

Embodiments of the present disclosure further provide a display device that includes the touch module as described above.

The display device also has the advantageous effects of the above touch module, and details are not repeated here.

Figure 5A:
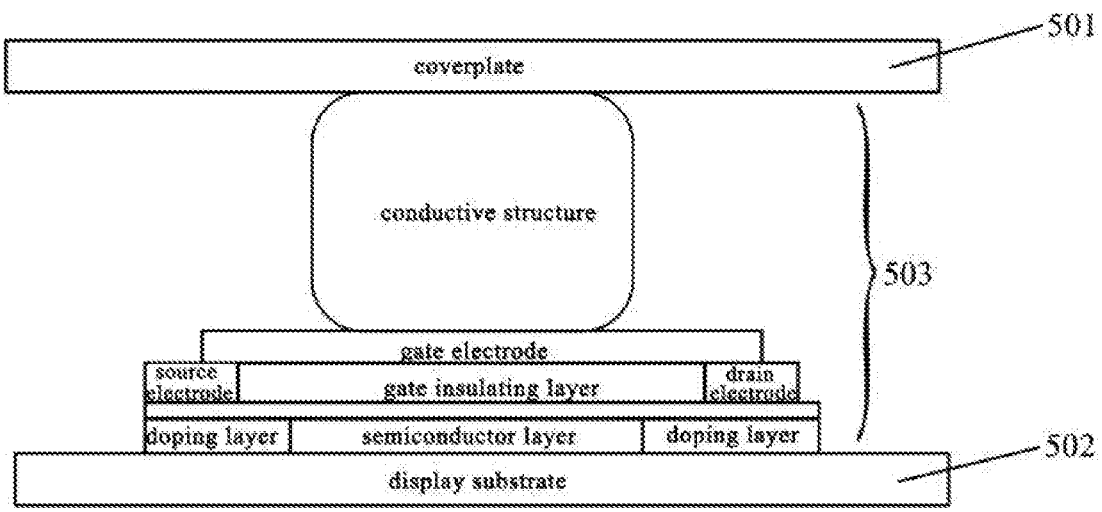
FIG. 5A is a cross-sectional view of a strain component of the display device provided by the embodiment of the present disclosure, in which a thin film transistor (TFT) is of a top gate structure.
Figure 5B:
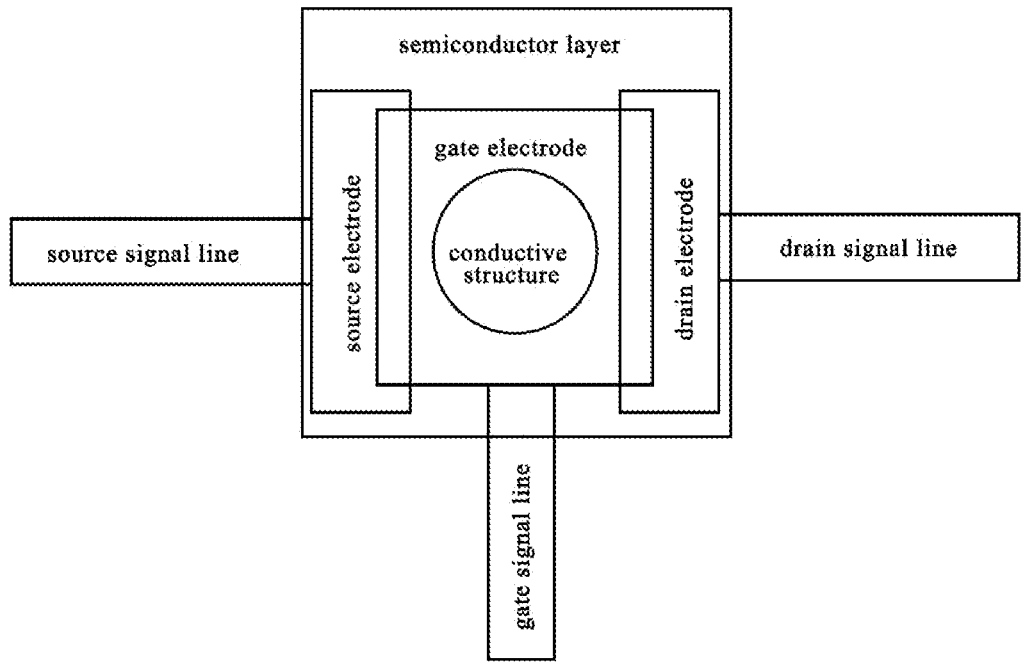
FIG. 5B is a top view of the strain component of the display device provided by the embodiment of the present disclosure, in which the thin film transistor (TFT) is of the top gate structure.

Further, as shown in FIG. 5A and FIG. 5B, the display device further includes a coverplate 501, a display substrate 502, and a circuit board 503. The instruction transmitting circuit 102 of the touch module is integrated in the circuit board, and the touch substrate 103 of the touch module is used as the coverplate of the display device.

As shown in FIG. 1, after the coverplate receives vibration pressures of different frequencies, a series of physical variables in the display device will generate different frequencies of change, and the display device is enabled to perform corresponding touch operations by means of the synchronization feedback device and the demodulation sub-circuit in the frequency determining circuit 101 and the instruction transmitting circuit 102.

The instruction transmitting circuit 102 is integrated in the circuit board, thereby reducing the space occupied by the instruction transmitting circuit 102 inside the display device, and facilitating the light and slim design of the display device.

The touch module is disposed on an outer surface of the display device. The touch module may be independent of the screen of the display device. For example, when the display device is a notebook computer, the touch module may be a touch panel outside the screen. Alternatively, the touch module may be integrated into the screen of the display device. For example, when the display device is a mobile phone, the touch module may be integrated into a touch screen of the mobile phone.

The following description is made by taking a case where the touch module is integrated in the screen of the display device and the frequency determining circuit 101 includes a synchronization feedback device 1011 and a demodulation sub-circuit 1012 as shown in FIG. 1 as an example. Furthermore, the demodulation sub-circuit 1012 may be integrated in the circuit board in order to facilitate the light and slim design of the display device.

Figure 2A:
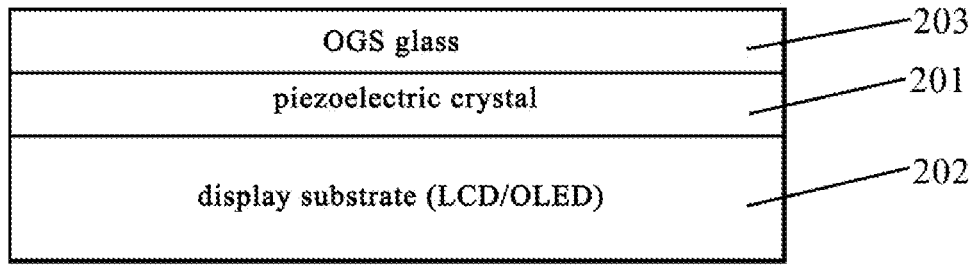
FIG. 2A is a first schematic diagram showing a position of a piezoelectric crystal when a screen in the display device provided by the embodiment of the present disclosure is an One Glass Solution (OGS) touch screen.
Figure 2B:
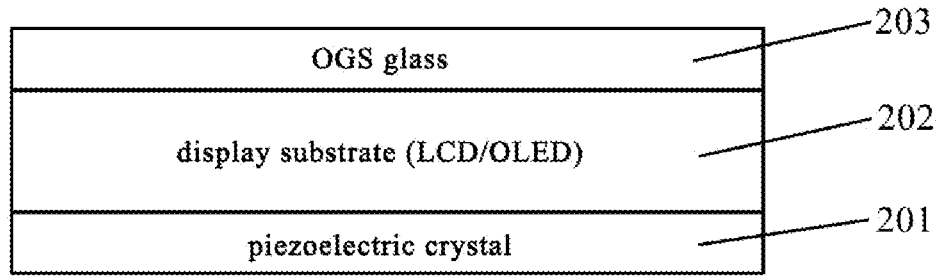
FIG. 2B is a second schematic diagram showing a position of the piezoelectric crystal when the screen in the display device provided by the embodiment of the present disclosure is the OGS touch screen.
Figure 2C:
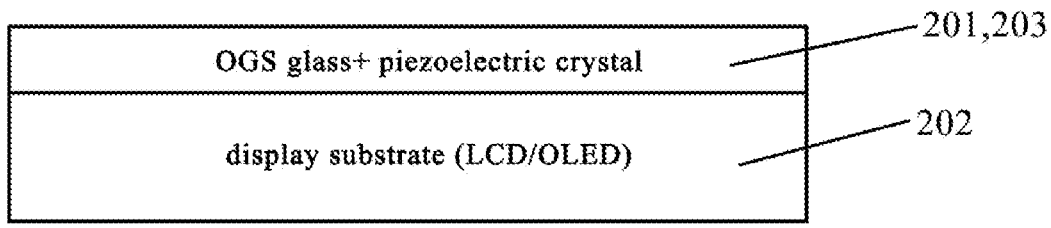
FIG. 2C is a third schematic diagram showing a position of the piezoelectric crystal when the screen in the display device provided by the embodiment of the present disclosure is the OGS touch screen.

In an optional embodiment, as shown in FIG. 2A to FIG. 2C, the synchronization feedback device 1011 includes a piezoelectric crystal 201 that has a signal output terminal electrically connected to a signal input terminal of the demodulation sub-circuit 1012. The piezoelectric crystal 201 is disposed between the coverplate 501 and the display substrate 502. Alternatively, the piezoelectric crystal 201 is disposed on a side of the display substrate 502 facing away from the coverplate 501. Alternatively, the piezoelectric crystal 201 is integrally provided with the coverplate 501.

Under the action of a mechanical force, the piezoelectric crystal 201 will be deformed to generate a potential difference across both ends of a polar axis of the piezoelectric crystal 201, and outputs a voltage signal corresponding to the deformation. The piezoelectric crystal 201 will output a voltage signal of a synchronous frequency by causing the piezoelectric crystal 201 to be deformed in synchronism with the vibration of the coverplate 501.

When the screen of the display device is an OGS (One Glass Solution) touch screen, the coverplate and a touch sensing layer of the display device are both OGS glass. In this case, the piezoelectric crystal 201 may be disposed between the OGS glass 203 and the display substrate 202 (as shown in FIG. 2A), the piezoelectric crystal 201 is in direct contact with the OGS glass 203, and the piezoelectric crystal 201 is deformed by the vibration of the OGS glass 203 to output a voltage signal of a synchronous frequency. Alternatively, the piezoelectric crystal 201 may be disposed on a side of the display substrate 202 facing away from the OGS glass 203 (as shown in FIG. 2B). In this case, an upper surface of the display substrate 202 is in direct contact with the OGS glass 203, and a lower surface of the display substrate 202 is in direct contact with the piezoelectric crystal 201. In this way, the vibration of the OGS glass 203 will synchronously cause the display substrate 202 to vibrate, and the piezoelectric crystal 201 is deformed by the vibration of the display substrate 202 to output a voltage signal of a synchronous frequency. Or alternatively, the piezoelectric crystal 201 may be provided integrally with the coverplate 501 (as shown in FIG. 2C), that is, the piezoelectric crystal 201 is disposed inside the OGS glass 203, and in this case, the piezoelectric crystal 201 will generate a synchronous deformation due to receiving a force generated when the OGS glass 203 vibrates, to output a voltage signal of a synchronous frequency.

Figure 3A:
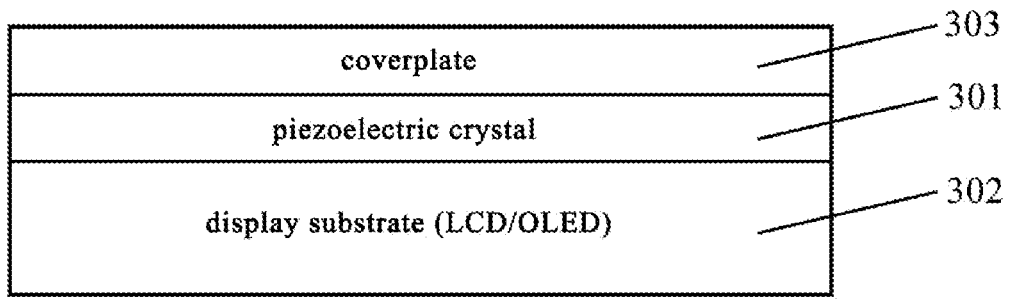
FIG. 3A is a first schematic diagram showing a position of the piezoelectric crystal when the screen in the display device provided by the embodiment of the present disclosure is an On-cell touch screen.
Figure 3B:
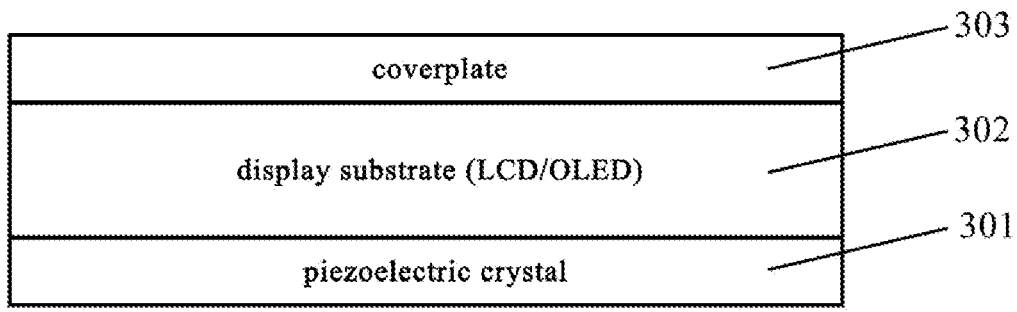
FIG. 3B is a second schematic diagram showing a position of the piezoelectric crystal when the screen in the display device provided by the embodiment of the present disclosure is the On-cell touch screen.
Figure 3C:
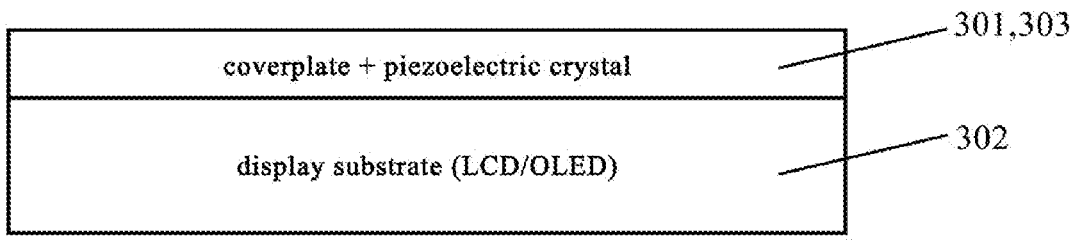
FIG. 3C is a third schematic diagram showing a position of the piezoelectric crystal when the screen in the display device provided by the embodiment of the present disclosure is the On-cell touch screen.

When the screen of the display device is an On-cell touch screen, the touch sensing layer of the display device is located between a color filter and a polarization plate of the display substrate. In this case, a piezoelectric crystal 301 may be disposed between a coverplate 303 and a display substrate 302 (as shown in FIG. 3A), the piezoelectric crystal 301 is in direct contact with the coverplate 303, and the piezoelectric crystal 301 is deformed by the vibration of the coverplate 303 to output a voltage signal of a synchronous frequency. Alternatively, the piezoelectric crystal 301 may be disposed on a side of the display substrate 302 facing away from the coverplate (as shown in FIG. 3B). In this case, an upper surface of the display substrate 302 is in direct contact with the coverplate 303, and a lower surface of the display substrate 302 is in direct contact with the piezoelectric crystal 301. In this way, the vibration of the coverplate 303 will synchronously cause the display substrate 302 to vibrate, and the piezoelectric crystal 301 is deformed by the vibration of the display substrate 302 to output a voltage signal of a synchronous frequency. Or alternatively, the piezoelectric crystal 301 may be provided integrally with the coverplate 303 (as shown in FIG. 3C), that is, the piezoelectric crystal 301 is disposed inside the coverplate 303, and in this case, the piezoelectric crystal 301 will generate a synchronous deformation due to receiving a force generated when the coverplate 303 vibrates, to output a voltage signal of a synchronous frequency.

Figure 4:
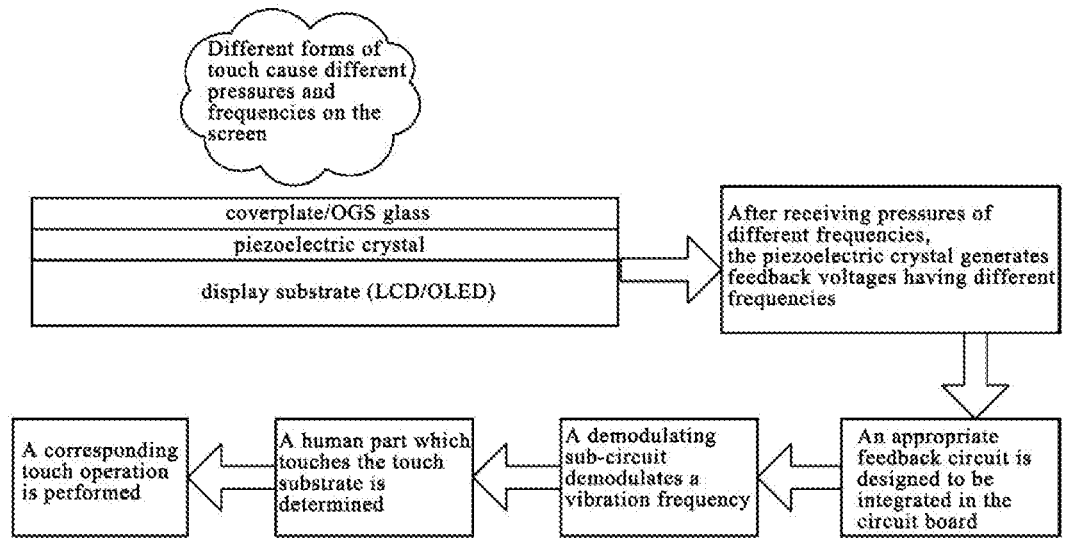
FIG. 4 is a schematic diagram showing an operation principle of a display device provided by an embodiment of the present disclosure, in which a synchronization feedback device includes a piezoelectric crystal.

In the above embodiments, the piezoelectric crystal generates deformation in synchronism with the vibration of the touch substrate, and by means of its own characteristics of the piezoelectric effect, can output the voltage signal that changes synchronously with the vibration of the touch substrate, thereby ensuring that the frequency determining circuit can accurately detect the frequency value of the vibration generated by the touch substrate. An operation principle of the display device based on these embodiments is as shown in FIG. 4.

Figure 8A:
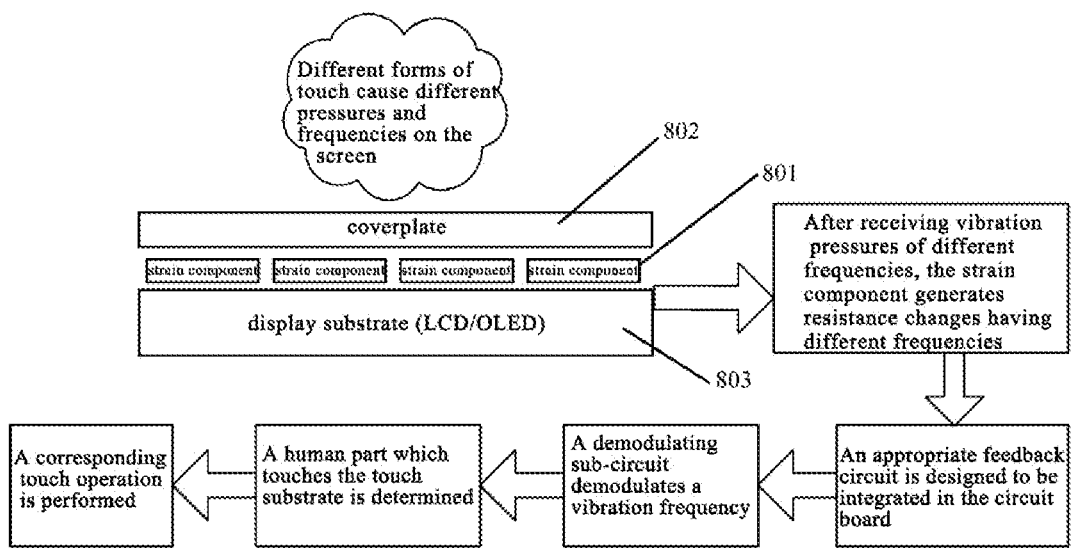
FIG. 8A is a first schematic diagram showing an operation principle of a display device provided by an embodiment of the present disclosure, in which a synchronization feedback device includes a strain component.
Figure 8B:
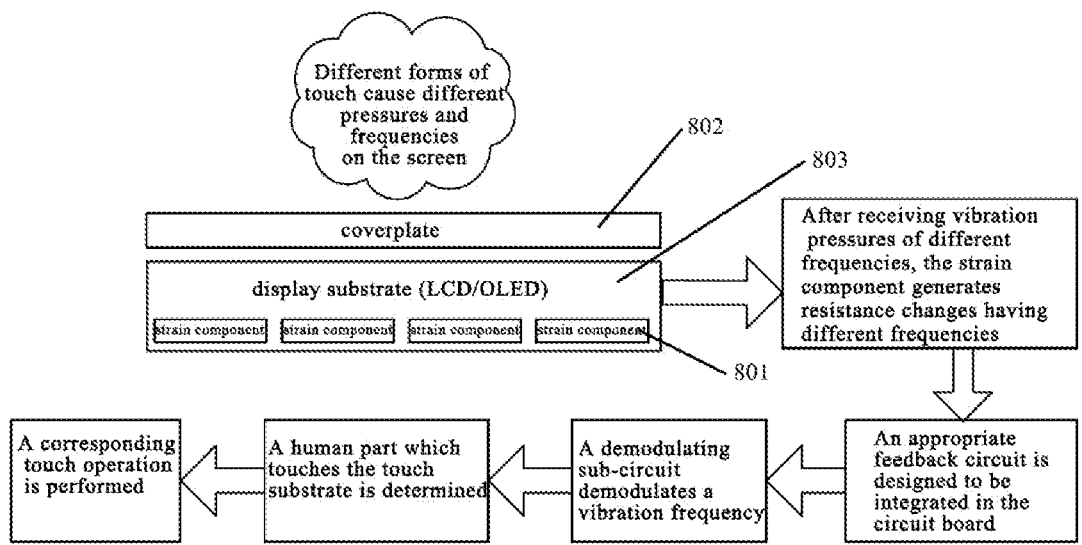
FIG. 8B is a second schematic diagram showing an operation principle of the display device provided by the embodiment of the present disclosure, in which the synchronization feedback device includes the strain component.

In another optional embodiment, as shown in FIG. 8A and FIG. 8B, the synchronization feedback device includes a strain component 801 that has a signal output terminal electrically connected to the signal input terminal of the demodulation sub-circuit 1012. The strain component 801 is disposed between the touch substrate (coverplate) 802 and the display substrate 803. Alternatively, the strain component 801 is disposed in the display substrate 803.

The strain component 801 is an element made of a sensitive gate or the like, and configured to measure strain, and will be deformed under the action of a mechanical force, to cause its resistance value to change accordingly. The strain component 801 will output a resistance signal of a synchronous frequency by causing the strain component 801 to generate deformation in synchronism with the vibration of the coverplate 802.

The strain component 801 may include a strain gauge. In the case where the screen of the display device is an OGS touch screen, the strain gauge is disposed between the OGS glass and the display substrate. In addition, in the case where the screen of the display device is an On-cell touch screen or an In-cell touch screen, the strain gauge is disposed between the coverplate and the display substrate.

Figure 6A:
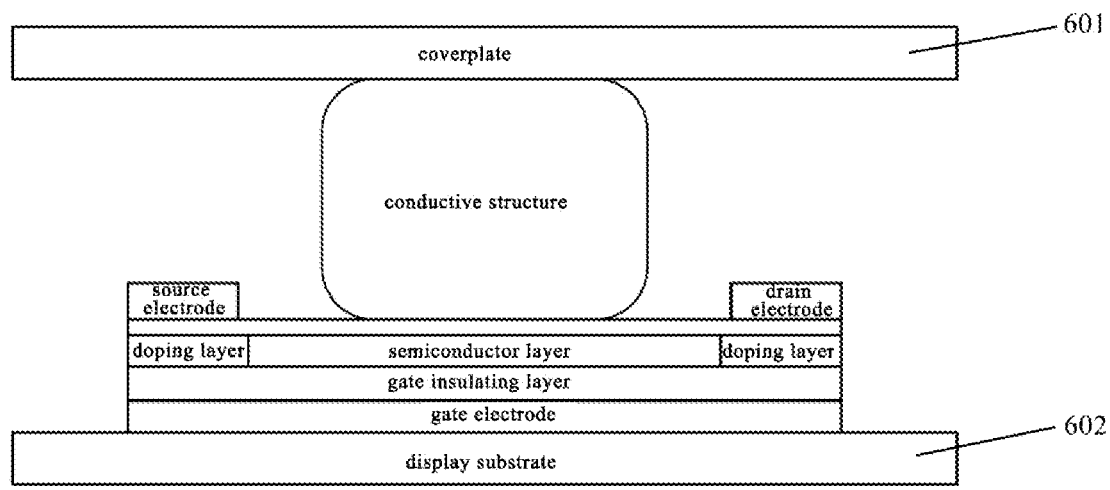
FIG. 6A is a cross-sectional view of a strain component of the display device provided by the embodiment of the present disclosure, in which a thin film transistor (TFT) is of a bottom gate structure.
Figure 6B:
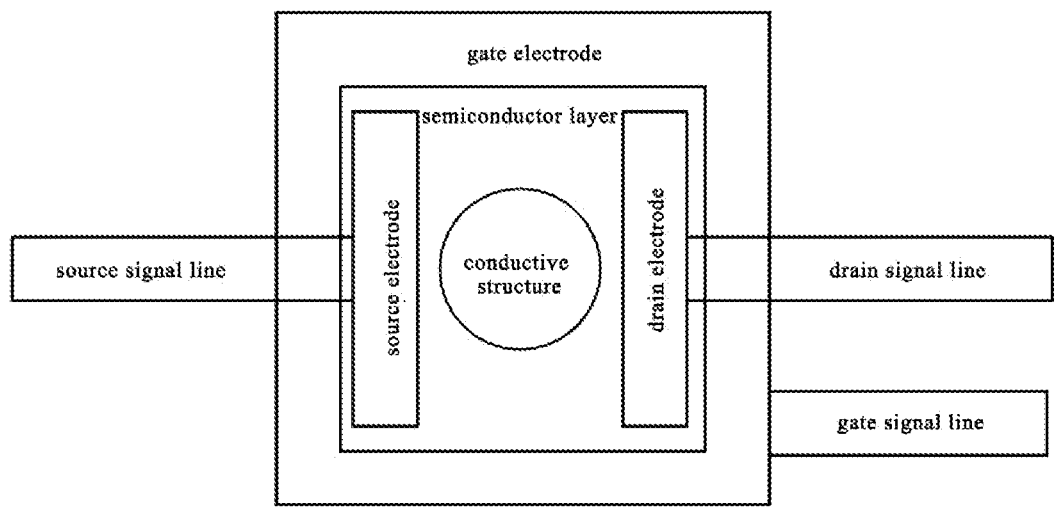
FIG. 6B is a top view of the strain component of the display device provided by the embodiment of the present disclosure, in which the thin film transistor (TFT) is of the bottom gate structure.

Furthermore, a strain component may be disposed in the display substrate as shown in FIG. 5A, FIG. 5B, FIG. 6A, and FIG. 6B. FIG. 5A and FIG. 5B are schematic diagrams showing the structure of the strain component when the TFT is a top gate structure. FIG. 6A and FIG. 6B are schematic diagrams showing the structure of the strain component when the TFT is a bottom gate structure. The strain component may also include a thin film transistor (TFT) having a channel, and a conductive structure. The conductive structure has one end connected to the coverplate and the other end connected to the channel, and is configured to synchronously transmit the vibration of the coverplate to the channel. The conductive structure may be made of a metal material, an insulating material or a photoresist (PR glue). Furthermore, the TFT in the strain component can be fabricated simultaneously with the TFT in a pixel circuit in the display substrate.

A plurality of strain components is disposed inside the display substrate, and source electrodes, drain electrodes, and gate electrodes of the TFTs in the strain components are all connected to the circuit board. The circuit board inputs a constant voltage to all the source electrodes of the TFTs, and an on-state voltage to all the gate electrodes of the TFTs, and connects the drain electrodes of the TFTs to a resistance test circuit. In the case where the user touches the coverplate to cause a vibration of the coverplate, the conductive structure generates a pressure on a semiconductor structure in the TFT, which pressure causes the resistivity of a semiconductor in the channel to change, thereby causing resistance between the source electrode and the drain electrode of the TFT to change in synchronism with the frequency of the vibration generated by the coverplate, i.e., outputting a resistance signal that changes in synchronism with the vibration of the touch substrate.

Figure 7A:
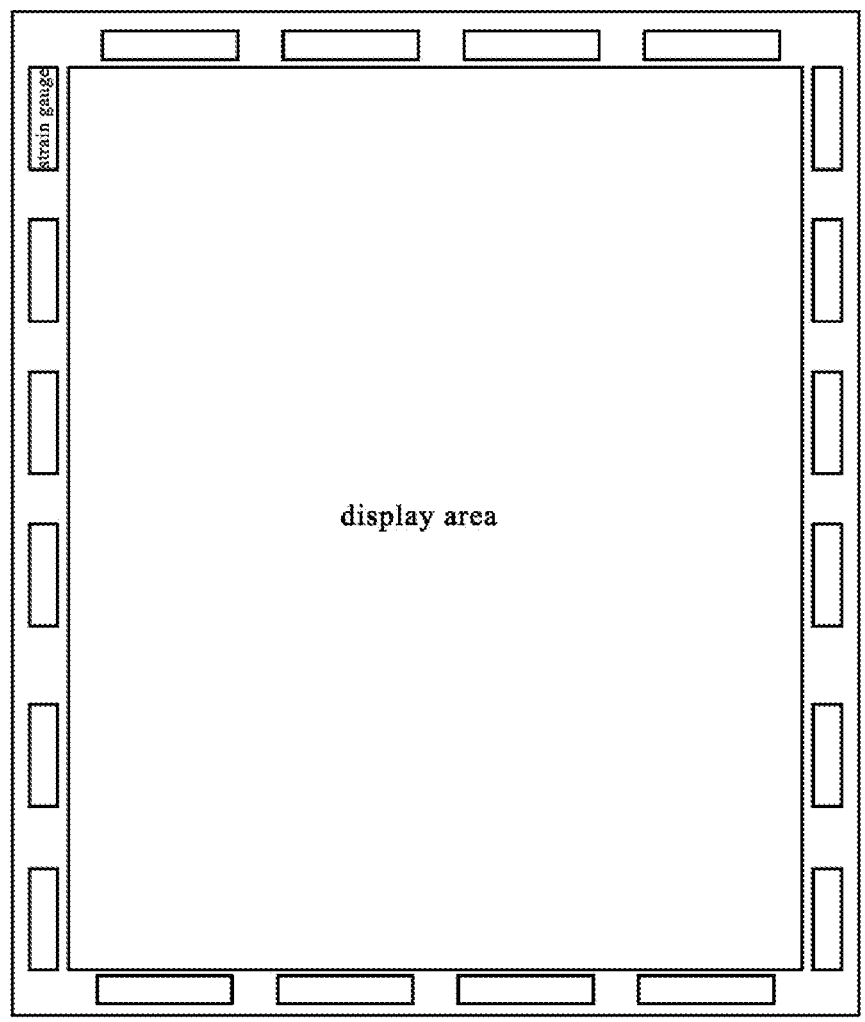
FIG. 7A is a schematic structural diagram showing a position of the strain component in the screen of the display device provided by the embodiment of the present disclosure.
Figure 7B:
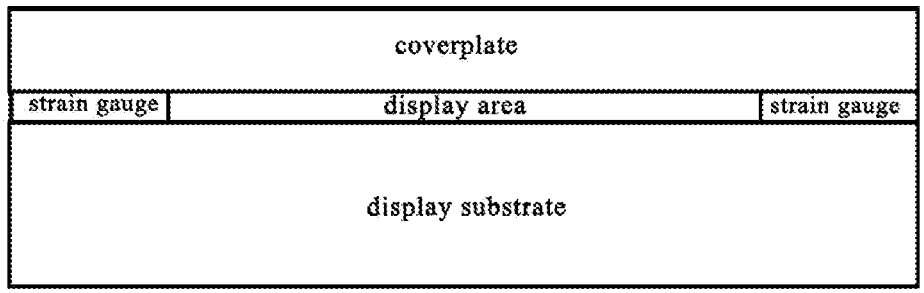
FIG. 7B is a cross-sectional view showing the position of the strain component in the screen of the display device provided by the embodiment of the present disclosure.

It should be noted that, in order to ensure the display effect of the display device, the strain components are all disposed in a non-display area at the edge of a display area of the screen, as shown in FIG. 7A and FIG. 7B. Since the strain components are thin and have small sizes, they have small impact on the development of the display device towards the full screen. The operation principle of the display device based on the present embodiment is shown in FIG. 8A and FIG. 8B.

In the embodiment, the strain components are deformed synchronously with the vibration of the touch substrate, and by means of their own characteristic of the strain effect, can output a resistance signal that changes synchronously with the vibration of the touch substrate, thereby ensuring the frequency determining circuit can accurately detect the frequency value of the vibration generated by the touch substrate.

The display device in the above two embodiments may be an organic light-emitting diode (OLED) display device, in which the display substrate is an OLED substrate. Alternatively, the display device may be a liquid crystal display (LCD) display device, in which the display substrate is an array substrate.

Figure 9:
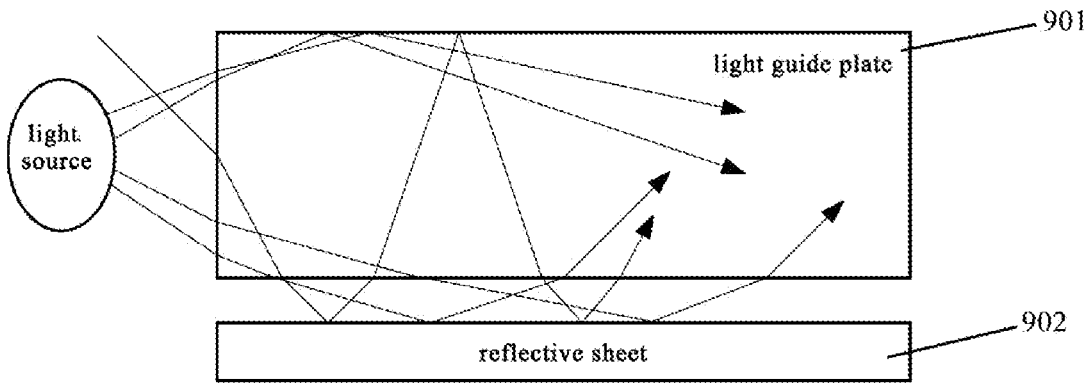
FIG. 9 is a schematic structural diagram of a light source, a light guide plate, and a reflective sheet when the display device provided by an embodiment of the present disclosure is a liquid crystal display (LCD)
Figure 10:
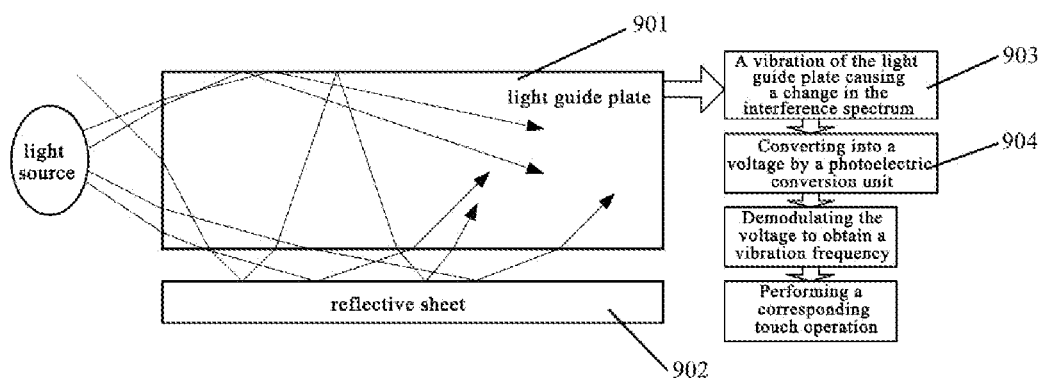
FIG. 10 is a schematic diagram showing an operation principle of a display device provided by an embodiment of the present disclosure when the synchronization feedback device includes a light receiving device.

In another optional embodiment, the display device is an LCD display device, as shown in FIG. 9 and FIG. 10, in which the display substrate includes a light guide plate 901 and a reflective sheet 902, between which interference light is formed. The synchronization feedback device includes: a light receiving circuit 903 which is disposed between the light guide plate 901 and the reflective sheet 902 and which is configured to detect an interference spectrum between the light guide plate 901 and the reflective sheet 902; and a photoelectric conversion circuit 904, which has a signal output terminal electrically connected to the signal input terminal of the demodulation sub-circuit 1012, and which is configured to output an electrical signal corresponding to the interference spectrum detected by the light receiving circuit 903.

Since an optical fiber has a very small diameter, the light receiving circuit 903 may be a fiber optic probe disposed between the light guide plate 901 and the reflective sheet 902. Alternatively, the light receiving circuit 903 may be a planar optical waveguide formed on the reflective sheet 902, and the optical waveguide may be made of silicon nitride. In the process of the light receiving circuit 903 detecting the interference spectrum between the light guide plate 901 and the reflective sheet 902, if the touch substrate vibrates, the light guide plate 901 may be caused to have a synchronous vibration, resulting in a synchronous change in the interference spectrum between the light guide plate 901 and the reflective sheet 902. The light receiving circuit 903 outputs an optical signal that changes in synchronism with the detected interference spectrum to the photoelectric conversion circuit 904, and the photoelectric conversion circuit 904 converts the optical signal into an electrical signal carrying the synchronous change in the interference spectrum, which is then demodulated by the demodulation sub-circuit 1012 to finally obtain a frequency value of the vibration generated by the touch substrate. The photoelectric conversion circuit 904 may be integrated in the circuit board to facilitate the light and slim design of the display device.

In the embodiment, the interference spectrum between the light guide plate and the reflective sheet is detected based on the characteristics in which the interference spectrum is changed synchronously due to the vibration of the light guide plate caused by the vibration of the touch substrate, to obtain the optical signal which is changed synchronously, and the optical signal is then converted into an electrical signal by the photoelectric conversion circuit while maintaining the frequency characteristics, thereby ensuring that the frequency determining circuit can accurately detect the frequency value of the vibration generated by the touch substrate. The operation principle of the display device based on this embodiment is shown in FIG. 10.

Figure 11:
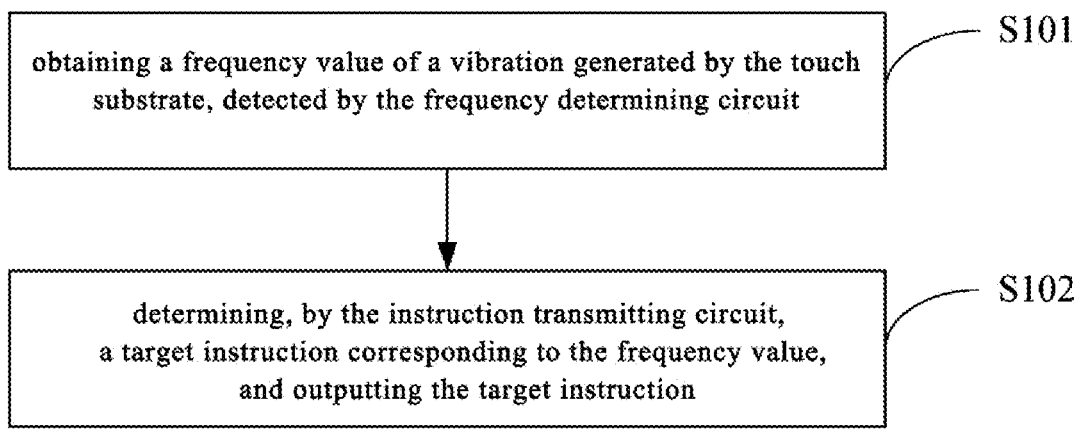
FIG. 11 is a flowchart of a method for operating a touch module provided by an embodiment of the present disclosure.

Embodiments of the present disclosure further provide a method for operating a touch module, which is applied to the touch module as described above. As shown in FIG. 11, the method includes:

Step 101: obtaining a frequency value of a vibration generated by the touch substrate detected by the frequency determining circuit; and Step 102: determining, by the instruction transmitting circuit, a target instruction corresponding to the frequency value, and outputting the target instruction.

In this embodiment, the target instruction is determined by detecting the frequency value of the vibration generated by the touch substrate when it is operated by the user, instead of by determining the target instruction by means of the sensors disposed around the screen. In this way, the sensors disposed around the screen of the display device can be omitted without adversely affecting functions, and the screen-to-body ratio of the screen can be increased. Therefore, the technical solution provided by the embodiment of the present disclosure can not only save the production cost of the display device, but also contribute to the development of the display device towards the full screen.

The touch substrate is disposed on an outer surface of the touch module, and a user may contact the touch substrate through different parts. Since proportions of muscles and bones in different human body parts are different and a series of ingredients such as moisture and/or calcium inside the bones are also different, when the different human body parts make contact with the touch substrate, it is equivalent to different objects contacting the screen, resulting in different frequency values of vibrations. That is, when the different human body parts are in contact with the screen, the frequency values of vibrations generated by the touch substrate are different. For example, a frequency value of a vibration generated by the touch substrate when a finger touches the touch substrate is a first frequency value, a frequency value of a vibration generated by the touch substrate when an ear makes contact with the touch substrate while getting close to an earpiece is a second frequency value, and a frequency value of a vibration generated by the touch substrate when a nail makes contact with the touch substrate is a third frequency value. Here, the first frequency value, the second frequency value, and the third frequency value are different from one another. The above gives merely several examples of human body parts that may come into contact with the touch substrate, and the human body parts are not limited thereto, and the contact may take place between the human body part such as a face, a knuckle or the like and the touch substrate.

By associating a frequency value of a vibration generated by the touch substrate with a corresponding human body part, a human part through which the user makes contact with the touch substrate can be then directly determined based on a frequency value of a vibration generated by the touch substrate detected by the frequency determining circuit. Specifically, the associated setting between a frequency value and a human body part may be carried out by associating the frequency value of the vibration generated by the touch substrate when a user makes contact with the touch substrate through the human body part for the first time with the human body part. Of course, it can be understood by those skilled in the art that the associated setting between a frequency value and a human body part may also be carried out by collecting a frequency value of a vibration generated by the touch substrate due to a predetermined one or more contacts or multiple consecutive contacts that the user makes with the touch substrate through the human body part, and associating the frequency value with the human body part. This will not be described in detail herein.

In addition, a target instruction corresponding to a contact between each part and the touch substrate is set in advance, which is equivalent to a target instruction corresponding to a frequency value generated by the touch substrate, and a mapping relationship between them is stored in the instruction transmitting circuit, whereby the instruction transmitting circuit is capable of determining the target instruction based on the frequency value of the vibration generated by the touch substrate, detected by the frequency determining circuit. For example, if a case where an ear makes contact with the touch substrate corresponds to a screen blackout instruction, the screen is blacked out to prevent any accidental touch when the user receives a voice message and the ear makes contact with the touch substrate and the touch module detects that a frequency value of a vibration generated by the touch substrate is the second frequency value. For another example, if a case where a nail makes contact with the touch substrate in a mail input interface corresponds to a picture insertion instruction, a picture insertion operation is performed when the user touches the touch substrate with the nail in the mail input interface displayed by the display device and the touch module detects that a frequency value of a vibration generated by the touch substrate is the third frequency value.

Further, the obtaining the frequency value of the vibration generated by the touch substrate, detected by the frequency determining circuit includes obtaining an electrical signal, which changes in synchronism with the vibration of the touch substrate and is outputted by sensing the vibration of the touch substrate by the synchronization feedback device; and demodulating, by the demodulation sub-circuit, the electrical signal output by the synchronization feedback device to obtain the frequency value of the vibration generated by the touch substrate.

In some optional embodiments, the frequency determining circuit may include: a synchronization feedback device which senses the vibration of the touch substrate and outputs an electrical signal that changes in synchronism with the vibration of the touch substrate; and a demodulation sub-circuit, which has a signal input terminal electrically connected to a signal output terminal of the synchronization feedback device, and which is configured to demodulate the electrical signal outputted by the synchronization feedback device to obtain the frequency value of the vibration generated by the touch substrate.

The synchronization feedback device can make direct or indirect contact with the touch substrate, and changes itself synchronously, such as vibration or deformation, due to a vibration of the touch substrate, and thus outputs an electrical signal that changes in synchronism with the vibration of the touch substrate according to its own electrical characteristics. For example, the synchronization feedback device may be a piezoelectric ceramic, which is in direct contact with the touch substrate. During the vibration of the touch substrate, the piezoelectric ceramic is synchronously pressed and deformed to output a voltage signal that changes in synchronism with the vibration of the touch substrate.

Alternatively, the synchronization feedback device may not be in contact with the touch substrate, but sense the vibration of the touch substrate through an optical medium or air medium between the synchronization feedback device and the touch substrate to output an electrical signal that changes in synchronism with the vibration of the touch substrate. For example, the synchronization feedback device may be an air pressure sensor, and the touch module includes a structural component that encloses a sealed space together with the touch substrate, in which an air pressure changes synchronously during the vibration of the touch substrate, and the air pressure sensor detects a change in the air pressure in the sealed space to output an electrical signal that changes in synchronism with the vibration of the touch substrate.

The above merely illustrates two modes i.e., via direct contact and via interval sensing, in which the synchronization feedback device realizes the sensing of the vibration of the touch substrate to output an electrical signal that changes in synchronism with the vibration of the touch substrate. In other embodiments, it may be implemented by components such as strain gauges, and the above mode is not limited.

The synchronization feedback device outputs the electrical signal that changes synchronously with the vibration of the touch substrate, that is, the synchronization feedback device outputs a waveform curve carrying frequency values of vibrations generated by the touch substrate, which waveform curve needs to be demodulated by a demodulation circuit so as to enables the analysis of the frequency value of the vibration generated by the touch substrate.

In this embodiment, since the synchronization feedback device can output an electrical signal that changes synchronously with the vibration of the touch substrate, the demodulation of the electrical signal by the demodulation circuit will result in a more accurate frequency value of the vibration generated by the touch substrate, making it possible to improve the touch module's detection accuracy of the frequency value of the vibration generated by the touch substrate.

Unless otherwise defined, technical or scientific terms used herein should have the same meaning as commonly understood by those having ordinary skills in the art to which the present disclosure pertains. Terms such as "first" and "second" used herein are used merely to distinguish different constituent components rather than to indicate any sequence, number or importance. The terms "comprising", "including" or other variants thereof are intended to mean that the element or item stated before such terms encompasses elements, items and equivalents thereof listed after these terms without excluding other elements or items not expressly listed. The terms "connect", "connected" or the like are not intended to define physical or mechanical connection, but may include an electrical connection, either direct or indirect. Such words as "up", "down", "left" and "right" are merely used to represent a relative positional relationship, and when an absolute position of the described object is changed, the relative position relationship will be changed accordingly.

It will be understood that when an element such as a layer, a film, a region or a substrate is referred to as being "on" or "under" another element, it can be directly "on" or "under" the other element, or intervening elements may be present.

The embodiments of the present disclosure have been described above with reference to the drawings, but the present disclosure is not limited to the specific embodiments described above, and the specific embodiments described above are merely illustrative and not restrictive. In the light of the present disclosure, many forms may be made by those skilled in the art without departing from the spirit and scope of the disclosure, and all these forms fall within the protection scope of the present disclosure.

What is claimed is:

1. A display device, comprising a touch module that comprises:
   a touch substrate;
   a frequency determining circuit configured to detect different frequency values of vibration generated by the touch substrate due to different human body parts being in physical contact with the touch substrate; and
   an instruction transmitting circuit, having a signal input terminal electrically connected to a signal output terminal of the frequency determining circuit, and configured to, in response to the frequency determining circuit detecting one of the frequency values due to a corresponding one of the human body parts being in physical contact with the touch substrate, determine from a plurality of target action instructions corresponding to the different frequency values, a target action instruction corresponding to the detected frequency value and output the determined target action instruction, such that the touch module is configured to conduct a target action corresponding to the determined target action instruction,
   wherein the display device further comprises a coverplate, a display substrate, and a circuit board, wherein the instruction transmitting circuit is integrated in the circuit board, and the touch substrate is used as the coverplate of the display device,
   wherein the frequency determining circuit comprises:
      a synchronization feedback device configured to sense the vibration of the touch substrate and output an electrical signal that changes in synchronism with the vibration of the touch substrate; and
      a demodulation sub-circuit, integrated in the circuit board, having a signal input terminal electrically connected to a signal output terminal of the synchronization feedback device, and configured to demodulate the electrical signal outputted by the synchronization feedback device to obtain the frequency value of the vibration generated by the touch substrate;
   wherein the display device is a liquid crystal display (LCD) device, and the display substrate comprises a light guide plate and a reflective sheet, between which interference light is formed;
   wherein the synchronization feedback device comprises:
      a light receiving circuit disposed between the light guide plate and the reflective sheet and configured to detect an interference spectrum between the light guide plate and the reflective sheet; and
      a photoelectric conversion circuit, having a signal output terminal electrically connected to the signal input terminal of the demodulation sub-circuit, and configured to output an electrical signal corresponding to the interference spectrum detected by the light receiving circuit.

2. The display device according to claim 1, wherein the synchronization feedback device comprises a piezoelectric crystal having a signal output terminal that is electrically connected to the signal input terminal of the demodulation sub-circuit;
   the piezoelectric crystal is disposed between the coverplate and the display substrate;
   or, the piezoelectric crystal is disposed on a side of the display substrate facing away from the coverplate;
   or, the piezoelectric crystal is integrally provided with the coverplate.

3. The display device according to claim 1, wherein the synchronization feedback device comprises a strain component having a signal output terminal that is electrically connected to the signal input terminal of the demodulation sub-circuit;
   the strain component is disposed between the touch substrate and the display substrate;
   or, the strain component is disposed within the display substrate.

4. The display device according to claim 1, wherein the synchronization feedback device is made of a piezoelectric ceramic, which is in direct contact with the touch substrate and which is synchronously pressed and deformed during the vibration of the touch substrate to output an electrical signal that changes in synchronism with the vibration of the touch substrate.

5. The display device according to claim 1, wherein the synchronization feedback device is an air pressure sensor, and the touch module further comprises a structural component that encloses a sealed space together with the touch substrate, in which an air pressure changes synchronously during the vibration of the touch substrate, and the air pressure sensor detects a change in the air pressure in the sealed space to output an electrical signal that changes in synchronism with the vibration of the touch substrate.

6. The display device according to claim 1, wherein the frequency value of the vibration generated by the touch substrate comprises: a first frequency value that is a frequency value of a vibration generated by the touch substrate when a finger touches the touch substrate; a second frequency value that is a frequency value of a vibration generated by the touch substrate when an ear makes contact with the touch substrate while getting close to an earpiece; and a third frequency value that is a frequency value of a vibration generated by the touch substrate when a nail makes contact with the touch substrate, wherein the first frequency value, the second frequency value, and the third frequency value are different from one another.

7. The display device according to claim 1, wherein the frequency value of the vibration generated by the touch substrate is set in association with a human body part, wherein the associated setting is carried out by collecting the frequency value of the vibration generated by the touch substrate when a user makes contact with the touch substrate through the human body part for the first time.

8. The display device according to claim 1, wherein the target instruction comprises a normal display instruction, a screen blackout instruction, and a picture insertion operation instruction.

* * * * *